United States Patent

[11] 3,532,030

| [72] | Inventor | Hugh Grenville Margetts, Tyseley, Birmingham, England |
|---|---|---|
| [21] | Appl. No. | 730,176 |
| [22] | Filed | May 17, 1968 |
| [45] | Patented | Oct. 6, 1970 |
| [73] | Assignee | Girling Limited |
| [32] | Priority | May 22, 1967 |
| [33] | | Great Britain |
| [31] | | 23,754/67 |

[54] PISTONS
3 Claims, 12 Drawing Figs.

[52] U.S. Cl. .................................................. 92/208, 29/156.5
[51] Int. Cl. .................................................. F16j 1/04
[50] Field of Search ..................................... 92/208, 209, 214, 237; 29/156.5

[56] References Cited
UNITED STATES PATENTS

| 1,854,455 | 4/1932 | Day .......................... | 29/156.5 |
| 2,756,876 | 7/1956 | Watson et al ............. | 29/156.5 |
| 3,367,165 | 2/1968 | Coen ........................ | 72/348 |

FOREIGN PATENTS

| 701,881 | 1/1941 | Germany ................. | 29/156.5 |

Primary Examiner—Carroll B. Dority, Jr.
Attorney—Scrivener, Parker, Scrivener and Clarke ABSTRACT: The invention resides firstly in a cup-shaped piston, shaped by cold forming, in which the margin of the piston at the open end is deformed or upset radially inwardly to provide a recess for a sealing member. The resultant piston has a substantially uniform wall thickness, and thus has a good strength/weight ratio compared with pistons in which the recess is machined. The shoulder at the base of the recess may be formed by first forming an upstanding shoulder in a pressing operation and then machining off the upstanding part to leave a flat shoulder. In accordance with a further feature, the external radius at the corner of a pressed, cup-shaped piston may be reduced by an operation which includes applying an axial compressive load to the piston. Reduction of the radius may be effected solely by this means, or there may be an initial bulging of the piston followed by machining off of excess material.

Patented Oct. 6, 1970 3,532,030

PISTONS

This invention relates to an improved form of piston, particularly but not exclusively for use in hydraulically actuated vehicle brakes, and a method of manufacturing pistons.

A known form of disc brake comprises a generally cup-shaped piston working in a cylinder open at one end, the open end of the piston projecting out of the cylinder and bearing against a back plate carrying a friction pad. To actuate the brake, hydraulic fluid under pressure is supplied to the cylinder to act upon the end face of the piston and force it outwardly and thereby cause the friction pad to be applied to the brake disc.

The cylinder bore and piston seal is protected by means of a flexible annular boot connected on the one hand to the open end of the cylinder and on the other hand to the outer end of the piston. To minimize the length of the piston, the boot is received in annular recess formed at the outer end of the piston so that the portion of the boot engaging the piston can be accommodated inside the cylinder when the piston is fully retracted (brakes "off" condition).

The piston is formed as a cold forging, and the recess is formed by machining the piston, so as to reduce the outside diameter of the outer end portion thereof, so that the wall thickness of the cylindrical wall of the piston is reduced in this region. The minimum thickness of metal remaining in this region is dictated by the loads which must be transmitted by the piston, and as a result the remainder of the cylindrical wall is unnecessarily thick, resulting in turn in wastage of metal and excessive weight in the finished piston.

The present invention provides a piston of the general form outlined above, but modified to remove or minimize the stated disadvantages.

Broadly stated, the invention resides in a cup-shaped, cold-formed piston having a radially-inwardly deformed cylindrical portion at its open end.

More specifically, the invention includes a cup-shaped piston formed as a sheet metal pressing having at its open end an annular portion of reduced diameter but substantially equal wall thickness compared with the remainder of the cylindrical portion of the piston.

Preferably, the length of the piston is not greater than its outside diameter, and the end wall of the piston is curved concave outwardly, so that deflections of the piston in use and consequent stresses are reduced.

The invention also includes a method of making a piston of the above defined construction, comprising the steps of cold-forming a blank to form a cup having an end wall and a substantially cylindrical side wall, and then deforming the open end portion of the side wall radially inwardly.

A flat shoulder may be machined at the junction of the reduced portion with the remainder of the piston, and preferably the pressing operation is arranged so as to provide an upstanding shoulder in this region, the projecting part of which shoulder is machined off.

One form of piston and method of manufacture in accordance with the invention and some modifications will now be described, by way of example only, with reference to the accompanying drawings, in which.

Figure 1:
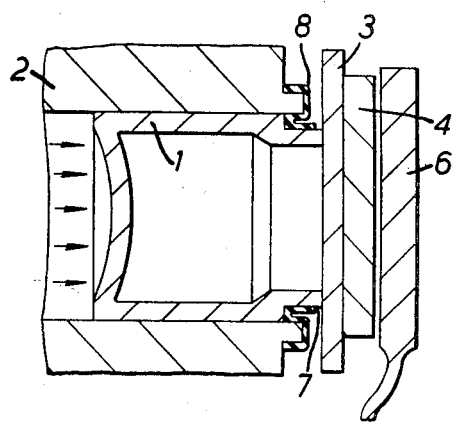
FIG. 1 is a diagrammatic section showing part of a disc brake assembly incorporating the piston.

In FIG. 1, a cup-shaped piston 1 working in a brake cylinder 2 bears against a brake backplate 3 carrying a friction pad 4 which cooperates with a brake disc 6.

At its outer end, the piston is formed with a circumferential recess 7 which receives the inner peripheral portion of a flexible annular boot 8, the outer periphery of which is secured to the cylinder 2.

As so far described, the piston is of known form, but the known pistons are formed by cold forged blanks, with the recesses machined in, so that the wall thickness at the recess is substantially less than that of the rest of the cylindrical wall of the piston.

In accordance with the present invention, however, the recess is created by deforming radially inwardly the outer end portion of the piston.

One method of forming the piston from a circular sheet metal blank is illustrated in FIGS. 2 to 5.

Figure 2:
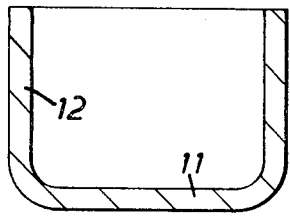
FIGS. 2 to 5 show successive stages in the formation of the piston.
Figure 4:
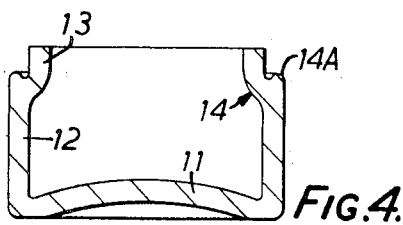
Figure 5:
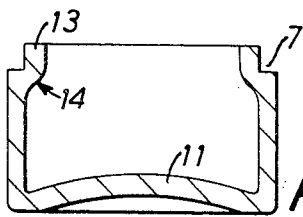

The forming stages, in succession, are as follows:

First, the blank is drawn into the form of a plain cup having a flat end wall 11 and a cylindrical side wall 12 (FIG. 2);

Secondly, the cup is pressed so as to upset the metal around the mouth of the cup to form a cylindrical ring 13 of reduced internal and external diameter, joined to the rest of the wall 12 by a smoothly blended shoulder 14. Preferably simultaneously, the end wall 11 is deformed into the upwardly convex curved form shown in FIG. 3;

Thirdly, in a separate press tool, the shoulder 14 is upset to the undercut form shown in FIG. 4, the metal outside the undercut forming an upwardly projecting shoulder 14A; and Finally, the projecting shoulder 14A is machined off to leave a sharp cornered recess 7 having a flat axial shoulder as shown in FIG. 5.

This method of forming the piston results in a final product of substantially constant wall thickness, so that the stress distribution is substantially uniform and without substantial wastage of metal. The curvature of the end wall 11 lends extra rigidity, which is preferably further enhanced by maintaining the length of the piston equal to or less than its outside diameter, although the length may exceed the outside diameter in some cases, and could, for example be equal to twice the diameter.

The second stage operation described above may be carried out by means of a two-stage press tool comprising a central punch or mandrel which enters the cup prior to an outer ring being forced down over the upper end of the cup to force the upper end portion inwardly against the central punch. The third stage may be effected in similar manner, but with the outer ring having an axially projecting lip to bite into the shoulder to form the undercut.

Figure 6:
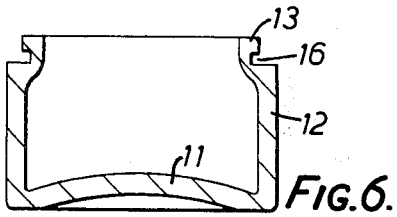
FIG. 6 shows a modified piston.

In a slightly modified piston, shown in FIG. 6, an annular groove 16 is machined at the junction of the reduced diameter portion 13 with the rest of the side wall, to receive, in use, a thickened rim of the sealing boot 8.

Figure 3:
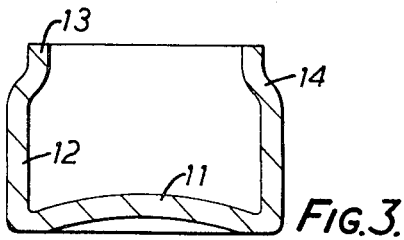

Another important and useful characteristic of the method described above, is the reduction of the external radius R between the end and side walls of the piston, readily noticeable from a visual comparison of FIGS. 2 and 3. This reduction in radius being effected by the application of an axial compressive load in the forming of the reduced diameter portion 13 and curving of the end wall 11. This reduction of the radius R in pistons formed as metal pressings is of particular value in vehicle disc brake assemblies, in which it can result in a saving of about one-eighth inch (3.18 mm.) in the overall width of the brake, with a corresponding saving in weight, not only of the piston but of the brake cylinder body and other associated components. In mass produced brakes, such savings are of great economic value.

Some other possible methods of achieving this reduction in radius are illustrated in FIGS. 7 to 12 inclusive, characterized in each case by an operation including the step of applying an axial compressive load to the cup-shaped piston to vary the radius in question.

Figure 7:
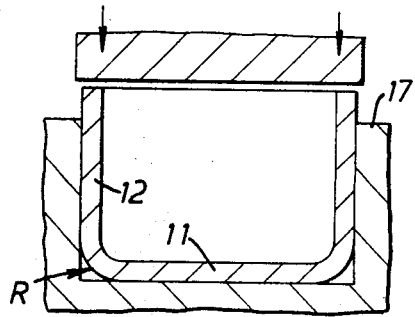
FIGS. 7 to 12 illustrate some methods of reshaping a cup-shaped piston formed as a metal pressing.
Figure 8:
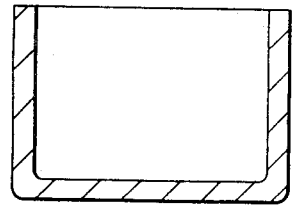
Figure 9:
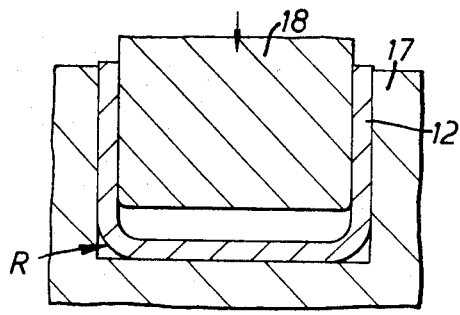

In FIG. 7, the piston having a radius R is pressed on its open end into a die 17 to effect reduction of the radius. The radius and overall length are thus reduced as shown in FIG. 8. In FIG. 9, a central punch or mandrel 18 is employed to work on the corresponding internal radius.

Figure 10:
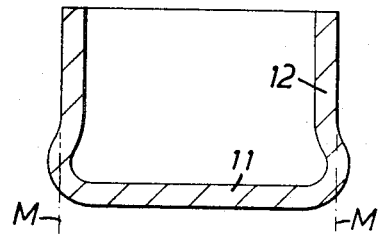

In FIG. 10, the piston is subjected to a compressive load which causes the base portion of the cup to swell out over an annular zone, and the operation is completed by machining off the excess material as indicated by the lines M.

Figure 11:
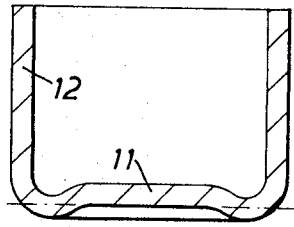

In FIG. 11, the axial pressure is applied to dome the end wall 11 so that effectively, a bulge is created over an annular zone adjacent the radius, and excess material is then removed as indicated by the line M.

Figure 12:
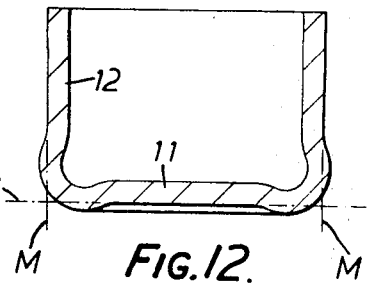

FIG. 12 illustrates a method which comprises a combination of the methods of FIGS. 10 and 11.

The above described methods of reducing the external radius could, of course, be used with advantage independently of the reduction in diameter of the opposite end portion 13 as described herein.

I claim:

1. A cup-shaped, cold formed piston comprising a substantially cylindrical side wall having a closed end integral with an end wall and an open end, said side wall being deformed adjacent said open end to have a substantially cylindrical end portion of smaller internal and external diameter than the remainder of said side wall and means defining an outwardly facing annular groove in a region between said side wall and said end portion.

2. A method of making a cup-shaped piston from a metal blank, comprising the steps of cold forming said blank into the form of a cup having a transverse end wall and a generally cylindrical side wall integral with said end wall, and then of deforming a marginal end portion of said side wall remote from said end wall to form an end portion of generally cylindrical form and of smaller external and internal diameter than said side wall, forming at the junction of said side wall and end portion an upstanding shoulder, and then machining off said upstanding shoulder to leave a flat shoulder.

3. A method of making a cup-shaped piston having a transverse end wall, a substantially cylindrical side wall integral therewith and an external radius connecting said walls, all from a circular blank of sheet metal, comprising the steps of pressing said blank to said cup shape, applying an axial compressive load to said cup to alter said external radius by creating an outwardly bulged annular zone in the region of the junction of said side wall and end portion, and then machining off excess material from said bulged zone.